United States Patent Office 3,809,769
Patented May 7, 1974

3,809,769
METHOD OF EXTRACTING TEA
Harold Rivkowich, Ossining, N.Y., and Warren C. Rehman, Montvale, William Knapp, Matawan, and Bert Borders, Keyport, N.J., assignors to Tetley Inc., New York, N.Y.
No Drawing. Filed Dec. 31, 1970, Ser. No. 103,276
Int. Cl. A23f 3/00
U.S. Cl. 426—312
4 Claims

ABSTRACT OF THE DISCLOSURE

The spent leaf discharge from an aqueous tea extraction step is treated with an oxidizing agent in the presence of water at elevated temperatures.

BACKGROUND OF THE INVENTION

Conventional processes for treating tea to prepare soluble solids for use in instant tea initially extract tea leaves with water at elevated temperature. The extraction may be carried out in a single batch, or continuously with either co-current or counter-current extraction of the leaf tea. The extraction conditions are designed to avoid harshness and astringency in the final beverage. The extracted tea leaves are discarded and the extract processed to produce concentrated liquid tea or soluble tea solids.

OBJECTS OF THE INVENTION

It is an object of the present invention to provide an improved, high yield process for extracting tea. Another object is to improve the yield of soluble solids which may be extracted from tea. A further object is to provide a method for extracting tea solids from spent tea leaves. These and other objects of the present invention will be apparent from the following description.

SUMMARY OF THE INVENTION

Increased yields of tea extract are obtained by subjecting the extracted or spent leaf from the extraction process to an oxidizing treatment. The oxidizing treatment is carried out by contacting the spent leaf with an oxidizing agent in the presence of water. Suitable oxidizing agents are hydrogen peroxide, ozone, or oxygen.

DETAILED DESCRIPTION

The process of the present invention is applicable to any process for extracting solids from tea leaves. The extract may be obtained by treating any type of tea, such as green, black or oolong tea. The extraction may be carried out in any suitable manner. The conventional method is to contact the tea with water, generally with water at an elevated temperature. The extraction may be carried out for varying periods of time, for example, from a few minutes to over 30 minutes, typically, from about 5 minutes to about 30 minutes. The extraction may be carried out counter-currently or co-currently in either continuous or batch operation. Whatever the manner of extraction, the result is an aqueous mixture or solution containing various solids extracted from the tea leaves. The spent tea leaves are then separated from the aqueous extract and discarded while the extract is subjected to further treatment, e.g., stripping, desludging, and evaporating.

It has now been found that additional soluble solids may be extracted from the spent tea leaf by subjecting the spent leaf to an oxidizing treatment. The oxidizing treatment is carried out by contacting an aqueous phase containing the spent leaf with an oxidizing agent. The oxidizing treatment comprises contacting the spent leaf with an aqueous solution of an oxidizing agent or by passing a gaseous oxidizing agent through an aqueous phase containing the spent tea leaf. Suitable oxidizing agents are hydrogen peroxide, ozone, oxygen, mixtures of ozone and oxygen, or mixtures of one or both of these gases with other innocuous gases, such as, for example, nitrogen, carbon dioxide or inert gases. Suitable oxidizing agents also include mixtures of ozone and air, oxygen and air, as well as air itself.

The hydrogen peroxide is present in an amount equal to from about 5% to about 25% of the leaf solids, preferably from about 10% to about 20%. Preferably the hydrogen peroxide is employed in the form of a solution containing from about 20% to about 50% hydrogen peroxide. When the oxidizing agent is gaseous, the volume of oxidizing gas, i.e. oxygen or ozone, or both, passed through the aqueous phase containing the spent leaf is at least equivalent to the foregoing amount of hydrogen peroxide. It is also possible, if desired, to employ both hydrogen peroxide and a gaseous oxidizing agent.

The oxidizing reaction may be carried out for periods of from about 30 minutes to over an hour at temperatures of from about 110° C. (230° F.) to about 132° C. (270° F.), preferably for a period of from about 45 minutes to about one hour at temperatures of from about 115° C. (240° F.) to about 127° C. (260° F.). After completion of the oxidizing treatment, the oxidized spent leaves and insolubles are removed and the remaining liquid is then processed similarly to the tea leaf extract or is combined with the tea leaf extract and processed therewith.

The oxidation treatment of the present invention increases the yield of soluble tea solids obtained from tea leaves up to about 50% as contrasted with conventional processes wherein no oxidation is carried out on the spent leaves.

The subsequent treatment steps are conventional and comprise stripping the extract to remove volatiles, cooling the extract to precipitate insolubles, separating insolubles from the extract, treating the insolubles to recover soluble material therefrom and adding the soluble material to the extract and evaporating the extract to form a concentrated liquid extract. If a solid soluble tea is desired, the concentrated liquid is then dried.

The overall yield of soluble tea solids is from about 44.5% to about 47.5% based on the weight of the tea leaves in the initial feed.

The following example illustrates the present invention without, however, limiting the same thereto.

EXAMPLE

Eight pounds of tea and 202 lbs. of water at a temperature of about 88° C. (190° F.) the charged to an atmospheric extractor. After 20 minutes, 175 lbs. of liquid extract containing 2.8 lbs. of soluble solids are withdrawn and after cooling are passed to a holding tank. Twenty-seven lbs. of moist spent leaves containing 5.2 lbs. of solids are also withdrawn and fed to a pressure reactor. Water (70 lbs.) and 4.6 lbs. of a 30% aqueous solution of hydrogen peroxide are added to the spent tea leaves. The mixture is heated to 240° F. at a pressure of 40 p.s.i.g. for about 50 minutes. At the end of this time, 74 lbs. of liquid extract containing 1.4 lbs. of soluble solids are withdrawn. After cooling the extract is added to the holding tank containing the extract from the atmospheric extractor. A total of 4.2 lbs. of soluble solids is recovered compared with only 2.8 lbs. when no oxidizing treatment is carried out on the spent leaves. This is an improvement in yield of soluble tea solids of 50%. The extract is then processed in conventional manner. The combined extracts are raised to an essence recovery tower. The liquid effluent from the tower is centrifuged and 0.35 lb. of sludge are removed. The sludge is treated to recover soluble solids therefrom and the recovered soluble solids are added to liquid extract being fed to the centrifuge. The liquid effluent from the centrifuge is concentrated to about 35–50% solids in a vacuum evaporator and then dried. The overall yield of soluble solids is from 44½% to 47½% based on the weight of tea leaves fed to the atmospheric extractor.

What is claimed is:

1. A method for extracting tea solubles from spent tea leaves which comprises contacting for at least about 30 minutes to about one hour at temperatures of from about 240° F. to about 260° F. an aqueous phase containing spent tea leaves with an oxidizing agent, the oxidizing agent being hydrogen peroxide or a gaseous oxidizing agent selected from ozone, oxygen, and mixtures containing ozone and oxygen, ozone and air, and oxygen and air, the amount of hydrogen peroxide being from about 5% to about 25% by weight of the spent leaves on a solid basis and the amount of gaseous oxidizing agent being equivalent to that of the hydrogen peroxide.

2. A method according to claim 1 wherein the contacting is carried out for a period of from about 45 minutes to about 1 hour.

3. A method according to claim 1 wherein the oxidizing agent is hydrogen peroxide, the hydrogen peroxide being present in a quantity of from about 5% to about 25% by weight of the spent tea leaf.

4. A method according to claim 3 wherein the quantity of hydrogen peroxide is from about 10 to about 20% by weight of the spent leaf tea.

References Cited
UNITED STATES PATENTS

| | | | |
|---|---|---|---|
| 3,531,296 | 9/1970 | Smithies | 99—77 |
| 3,151,985 | 10/1964 | Fobes | 99—76 X |
| 3,481,744 | 12/1969 | Giddey et al. | 99—77 |
| 1,916,468 | 7/1933 | Epstein | 99—77 |
| 3,269,906 | 2/1968 | Kwo-wei Chen | 99—76 X |
| 3,192,048 | 6/1965 | Liddiard | 99—76 X |
| 3,669,680 | 6/1972 | Gurkin et al. | 99—77 |
| 3,649,297 | 3/1972 | Millin | 99—77 |

FOREIGN PATENTS

| | | | |
|---|---|---|---|
| 262,758 | 6/1967 | U.S.S.R. | 99—77 |

FRANK W. LUTTER, Primary Examiner

S. L. WEINSTEIN, Assistant Examiner

U.S. Cl. X.R.

426—369, 435